United States Patent [19]

Rockenfeller et al.

[11] Patent Number: 4,572,720

[45] Date of Patent: Feb. 25, 1986

[54] WOOD SCREW

[75] Inventors: Gottfried Rockenfeller, Hilchenbach; Wolfgang Rockenfeller, Hilchenbach-Helberhausen, both of Fed. Rep. of Germany

[73] Assignee: Rockenfeller KG, Befestigungselemente, Hilchenbach, Fed. Rep. of Germany

[21] Appl. No.: 528,572

[22] Filed: Sep. 1, 1983

[30] Foreign Application Priority Data

Sep. 2, 1982 [DE] Fed. Rep. of Germany ... 8224737[U]
Sep. 2, 1982 [DE] Fed. Rep. of Germany ... 8224738[U]
Feb. 8, 1983 [DE] Fed. Rep. of Germany ... 8303394[U]

[51] Int. Cl.$^4$ ............................................. F16B 25/00
[52] U.S. Cl. ................... 411/387; 411/399; 411/394; 411/414; 411/311
[58] Field of Search .............. 411/263, 310, 311, 378, 411/386, 387, 399, 400, 411, 414, 416, 423, 424, 426, 425, 394, 453

[56] References Cited

U.S. PATENT DOCUMENTS

| | | | |
|---|---|---|---|
| 137,414 | 4/1873 | Burdick | 411/386 |
| 373,074 | 11/1887 | Jones | 411/386 |
| 471,179 | 3/1892 | Jones | 411/424 |
| 676,240 | 6/1901 | Latty | 411/424 |
| 2,001,869 | 5/1935 | Deniston, Jr. | 411/394 |
| 3,056,234 | 10/1962 | Nelsson et al. | 411/386 |
| 3,204,516 | 9/1965 | Wieber | 411/387 |
| 3,370,501 | 2/1968 | Ansingh | 411/387 |
| 4,258,607 | 3/1981 | McKewan | 411/413 |

Primary Examiner—Robert L. Wolfe
Assistant Examiner—Neill Wilson
Attorney, Agent, or Firm—Karl F. Ross; Herbert Dubno

[57] ABSTRACT

Disclosed is a wood screw with a head separated from a threaded extremity by an unthreaded shank whose diameter is less than the outer diameter and only slightly larger than the root diameter of the thread. A cylindrical or tapering neck inserted between the head and the shank has a diameter, at least in the immediate vicinity of the head, equaling the outer thread diameter. The threaded extremity terminates in a pyramidal tip with three or four sides, at least one edge of the pyramid being notched by an extension of the thread groove to act as a spur in cutting a bore ahead of the advancing screw thread. The turns of the thread, in one embodiment, have leading flanks merging into or overhung by rounded ridges enabling the screw to be hammered into a substrate of natural wood or particle-board composition.

13 Claims, 11 Drawing Figures

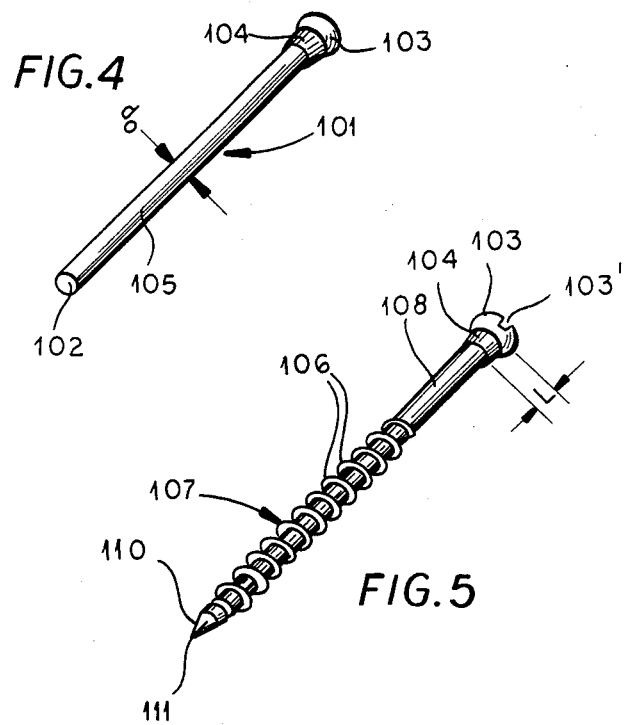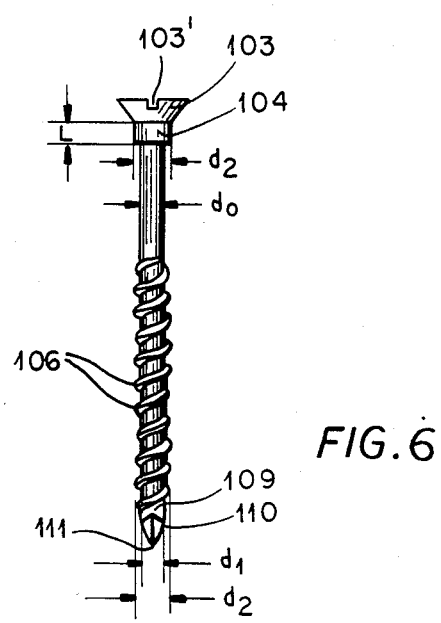

WOOD SCREW

FIELD OF THE INVENTION

Our present invention relates to a wood screw designed to be used in substrates of natural wood as well as of compositions such as those known as fiberboard or chipboard, collectively referred to as particle boards.

BACKGROUND OF THE INVENTION

The usual wood screw comprises a metallic rod or wire which has one end deformed into an enlarged head, generally by upsetting in a suitable swage, and has an opposite extremity formed with helical threads of a rather coarse pitch centered on the rod axis. The turns may extend over the full length of the rod up to its head but in many instances are separated therefrom by an unthreaded, i.e. cylindrical, rod portion designed to support a hinge, a bracket or some other attachment to be fastened to the substrate. Conventionally, the thread is formed by milling or chasing a helical groove into the rod extremity remote from the head so that the outer diameter of its turns equals that of the unthreaded portion or shank; this is considered desirable in order to eliminate any significant play between that shank and the surrounding rom of a hole in the attachment to be fastened which of course must be large enough to give passage to the thread. The cutting of the thread may be performed on a blank on which the head may have already been swaged, this head being usually provided with a transverse slit, a hexagonal recess or some other formation designed to be engaged by a tool driving the screw into the substrate.

The machining of such a thread causes a loss of material of more than 20% in many instances. In order to avoid this waste, is is known to reduce the diameter of the rod portion to be threaded by passing it through a suitable die, of the type used in wire drawing, and to subject that rod portion thereafter to a rolling process which forms the thread without chip removal. The thinning of this rod portion prior to deformation by the roller has the purpose of preventing the resulting thread turns, produced by displacement of metal from the rolled groove, from significantly exceeding the diameter of the unthreaded part of the rod. As with the aforedescribed machining operation, the end of the rod opposite the head must be shaped into a point to facilitate the initial driving of the screw into the workpiece. Even so, it is frequently necessary to predrill the substrate to form therein a bore having the diameter of the thread core, an inconvenience which also tends to weaken the hold of the substrate on the scew.

While the rolling of the thread saves metal, the initial thinning of the rod—which the art appears to have heretofore considered indispensable—still constitutes a costly and somewhat cumbersome operation. On the other hand, woods screws with rolled-on threads have greater mechanical strength than those of like dimensions produced by machining.

OBJECTS OF THE INVENTION

An important object of our invention is to provide an improved wood screw which preserves the advantages of the rolled-on thread but can be manufactured more economically, particularly through elimination of the aforedescribed rod-thinning operation.

Another object is to provide a woods screw of this character whose threading into a substrate is made easier by a reduction in the diameter of the unthreaded rod portion or shank immediately adjoining its threaded extremity, along with a tip configuration designed to prepare a path for the thread core in the substrate, all with maintenance of a high resistance against extraction from the substrate and with firm seating of the screw shank in a hole of a hinge or other attachment to be fastened thereto.

A further object of our invention is to provide such a wood screw with a thread profile enabling it to be driven—at least partially—into a substrate in the manner of a nail, i.e. by an axial force such as a hammer blow or the acceleration of a pneumatic gun, in cases where a rapid insertion is desirable.

SUMMARY OF THE INVENTION

A wood screw according to our invention differs from the conventionally produced type of screw with rolled-on thread in that, on the one hand, the turns of its threaded extremity have an outer diameter substantially exceeding that of its unthreaded portion or shank while their root diameter is slightly less than that of the shank and, on the other hand, by the presence of a neck of lesser diameter than the head which lies between the latter and the shank, this neck having a maximum diameter substantially equaling the outer diameter of the turns. The neck could taper frustoconically from the immediate vicinity of the head to a diameter equaling that of the shank; it could also be cylindrical, over at least part of its axial length, with a diameter satisfying the aforestated relationship. In either case, but especially with a cylindrical shape, this neck will ensure a firm seating of the screw in a hole of the engaged attachment large enough to let the threaded screw extremity pass through.

The reduced diameter of the unthreaded shank reduces the effort that must be exerted in driving the last part of the screw into the substrate but does not significantly diminish the force holding it in position within the substrate as compared with conventional screws of the same initial rod diameter. The increase in the outer diameter of the turns over that of the rod comes about through the omission of the rod-thinning step before the thread is rolled on; the neck is shaped concurrently with the head, through the use of a suitable swage, so that no separate operating step is required for its formation. Thanks to the relative increase in the diameter of the thread core, a thinner blank may be used for producing a wood screw of given strength.

Another feature of our invention, advantageously though not indispensably combined with those just described, resides in the provision of a pyramidal tip with preferably not more than four sides on the end of the screw opposite its head, this tip thus having three or more edges converging toward the rod axis. The helical groove separating the thread turns advantageously extends partly into that tip so as to intersect at least one of these edges and form a notch therein whereby the edge so foreshortened acts as a tooth or spur—similar to one commonly used at the leading end of a drill bit—cutting a bore into the material of the substrate ahead of the advancing thread to make room for its core. This obviates the need for any predrilling of the substrate at the point where the wood screw is to be driven in.

Yet a further feature of our invention resides in the provision of a thread profile enabling such a wood screw to be hammered into the substrate, at least part of the way, or driven in by a nail gun. We have found that this becomes possible when each turn of the screw thread, in axial section, has a generally trapezoidal profile with a leading flank and a trailing flank converging radially outward at acute angles to an intermediate line perpendicular to the rod axis, with the leading flank terminating short of that line and adjoining a convex curve which traverses the intermediate line and preferably is an arc of a circle with a center located thereon; the curve then meets an inwardly sloping back edge extending to the trailing flank, preferably in a direction substantially orthogonal to the leading flank and at an angle of about 10° to 15° to the rod axis. The arc may extend over slightly more than 90°, thus forming a bulge which is the cross-section of a rounded rib overhanging the front face of the thread over its entire length. Even when the leading flank merges tangentially into the arc, the rounding of that front face and the rake angle formed by the receding back edge allow the elastic displacement of the substrate material by the axially advancing screw, especially when this material is natural wood.

BRIEF DESCRIPTION OF THE DRAWING

The above and other features of our invention will now be described in detail with reference to the accompanying drawing in which:

FIGS. 4–6 are views respectively corresponding to those of FIGS. 1–3 but for a somewhat modified wood screw embodying our invention;

SPECIFIC DESCRIPTION

Figure 1:
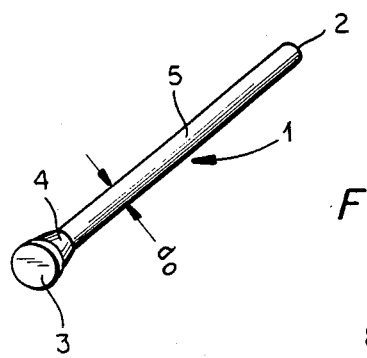
FIG. 1 is a perspective view of a blank for making a wood screw according to our invention.

FIG. 1 shows a blank for producing a wood screw according to our invention, comprising a smooth metallic rod 5, cut from a wire of indefinite length, which has a flat end 2 and opposite therefrom an enlarged head 3 adjoining a frustoconical neck 4; this neck tapers from a maximum diameter at head 3 to a minimum diameter equaling that of the rod 5. Head 3 may have a variety of conventional shapes but is here shown by way of example as being also tapered, with a wider apex angle than neck 4, so as to be countersunk in a complementary recess of a hinge or other attachment engageable by the wood screw to be formed from the blank 1. Head 3 and neck 4 are shaped jointly by upsetting the corresponding rod end in a swage of suitable configuration. The axial length of neck 4 (see FIG. 2) exceeds that of head 3 and approximately equals the rod diameter $d_0$.

Figure 2:
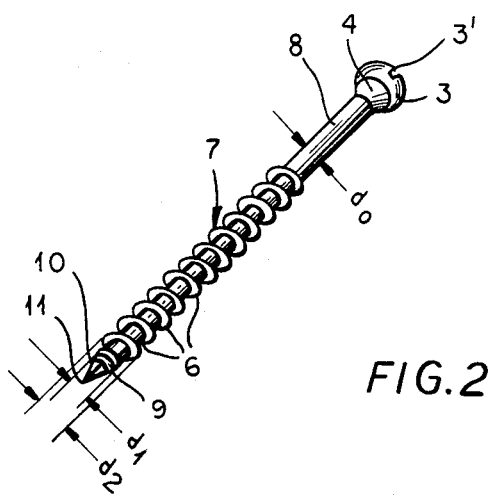
FIG. 2 is a perspective view of a wood screw formed from the blank of FIG. 1.
Figure 3:
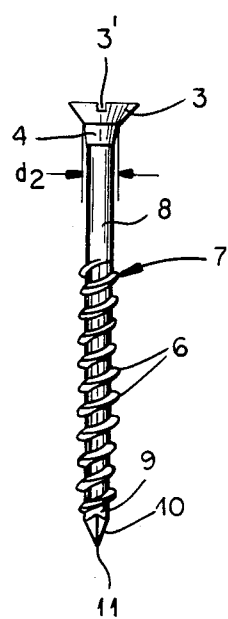
FIG. 3 is a side view of the wood screw of FIG. 3.

FIGS. 2 and 3 show the finished wood screw obtained from the blank 1 of FIG. 1. Head 3 now has an incision 3', engageable by a screwdriver, and with its neck 4 is separated by a smooth rod portion or shank 8 from a threaded extremity 7 of the rod provided with a multiplicity of helical turns 6. These turns are formed, as well known per se, by rolling a helical groove into the part 7 of the rod to produce a core of slightly reduced diameter $d_1$ while the metal displaced by this rolling operation is extruded into a helical ridge whose outer diameter $d_2$ exceeds the initial rod diameter $d_0$ still present at shank 8. The maximum diameter of neck 4, next to head 3, equals this outer diameter $d_2$ to minimize any play existing between the neck and the rim of a hole of an attachment to be fastened by the screw onto a substrate of wood or particle-board composition when that hole is just wide enough to clear the turns 6. Incision 3' could be replaced by cross-slits or other centrally symmetrical formations produced during the upsetting operation.

Figure 3A:
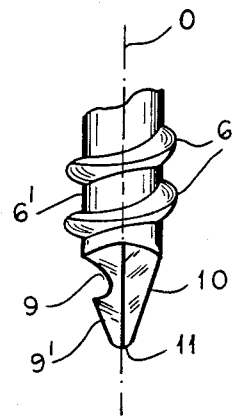
FIG. 3A is an enlarged side view of the tip of the screw, seen from a different angle.

As best seen in FIG. 3A, the front end of the finished screw opposite its head 3 is a tip 10 in the shape of a three-sided pyramid whose edges converge on the screw axis 0 at a ball point 11 of small spherical curvature, designed to facilitate an initial penetration of the substrate by that front end. The helical groove 6' separating the turns 6 of root diameter $d_1$ is extended into the tip 10 so as to intersect at least one of its edges, thereby forming a notch 9 that foreshortens that edge to leave a lateral tooth or spur 9' which, as the screw is being turned under axial pressure by a screwdriver or similar tool, cuts a bore into the substrate ahead of the advancing thread 6 to make room for its core. The tip 10 has an axial length slightly exceeding the pitch of thread 6.

FIGS. 4–6, in which elements corresponding to those of FIGS. 1–3 have been designated by the same reference numerals preceded by a "1" in the position of the hundreds digit, show a blank 101 and a wood screw produced therefrom which differ from their counterparts in the preceding Figures only in that the neck 104 adjoining the head 103 is cylindrical instead of frustoconical, with a diameter $d_2$ equaling the outer diameter of turns 106. The axial length or height L of this neck, as before, substantially equals the shank diameter $d_0$.

Figure 7:
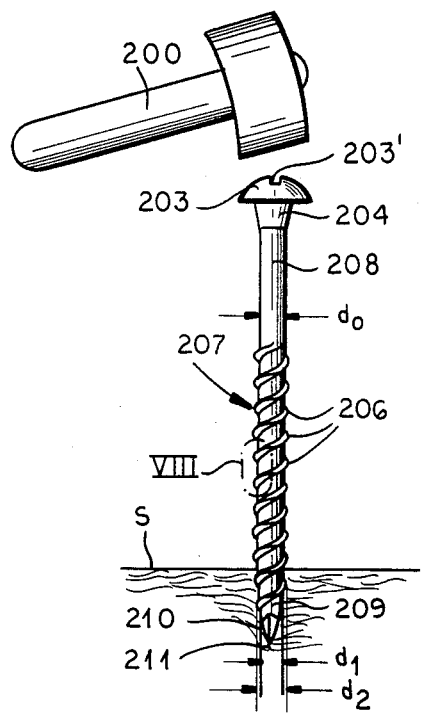
FIG. 7 is a view similar to FIGS. 3 and 6, pertaining to a further modification.
Figure 8:
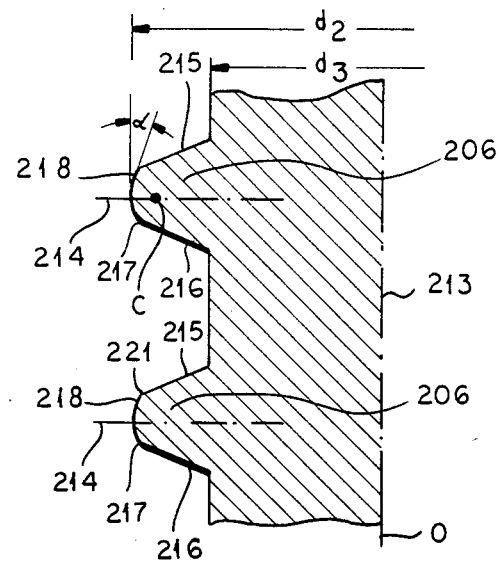
FIG. 8 is a fragmentary view in axial section, drawn to a greatly enlarged scale, of a segment of screw thread indicated at VIII in FIG. 7.

In FIG. 7, where elements corresponding to those of the preceding Figures are identified by the same numerals but with a "2" in the position of the hundreds digit, a wood screw according to our invention is shown being driven by blows of a hammer 200 into a substrate S such as a board of natural wood. The head 203 is here shown to be spherically convex. To facilitate axial penetration of the substrate without splitting or cracking by at least part of the threaded screw portion 207, the screw not only has a pyramidal tip 210 as described above but is also given a certain thread profile as particularly shown in FIG. 8, 9 or 10. Each turn 206 of the thread, when viewed in axial cross-section, has a trailing flank 215 and a leading flank 216 converging toward an intermediate line 214, perpendicular to axis 0, at acute angles here measuring about 15° in the case of flank 216 and about 30° in the case of flank 215. In FIG. 8 the front flank 216 merges tangentially into a curve 217, i.e. into an approximately quadrantal arc of a circle whose center C lies on the line 214. Curve 217, in turn, merges tangentially into a short back edge 218 including a rake angle $\alpha$ with the axial direction while being substantially orthogonal to flank 216. Angle $\alpha$ preferably ranges between approximately 10° and 15°. Back edge 218 meets the trailing flank 215 at an obtuse angle (here roughly of 135°) in a point 221.

Figure 9:
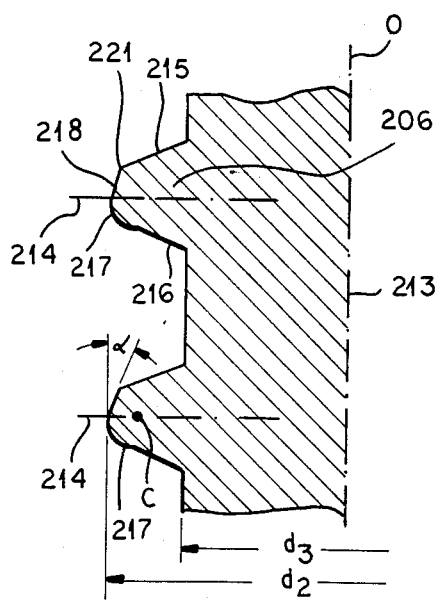
FIGS. 9 and 10 are two further sectional views like that of FIG. 8 but differing therefrom in some details.
Figure 10:
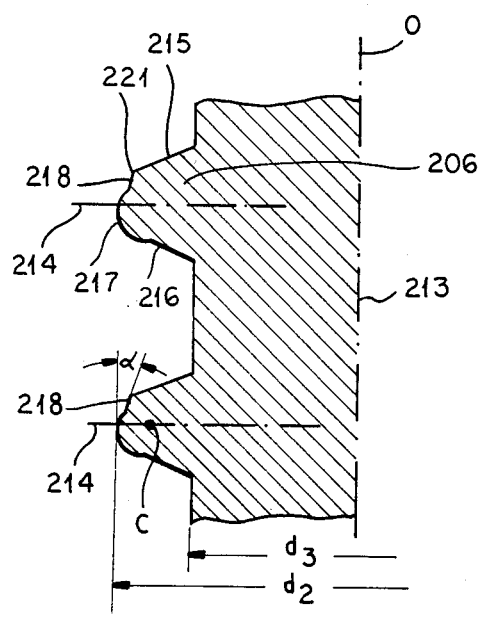

The thread profile of FIG. 9 differs from that of FIG. 8 in that the arc of curve 217 is extended beyond 90° so as to form a discontinuity at its junction with flank 216 which thereby constitutes an extension of a chord spanning this arc; back edge 218 is still tangent to the curve. In FIG. 10, however, the arc is further extended to provide another discontinuity at its junction with edge 218 which therefore now also constitutes an extension of a chord spanning the curve 217. In either of these instances the curve 217 is a bulge representing the cross-section of a rounded helicoidal rib overhanging the turn's front face whose intersection with the axial plane of FIGS. 8–10 is the leading flank 216.

We claim:

1. A wood screw comprising a metallic rod with a threaded extremity having helical turns centered on an axis, an enlarged head at an end opposite said extremity, an unthreaded portion separating said head from said extremity, and a neck of lesser diameter than said head interposed between the latter and said unthreaded portion, said turns having an outer diameter exceeding that of said unthreaded portion and a root diameter slightly less than that of said unthreaded portion, said neck having a maximum diameter substantially equaling said outer diameter, said neck having an axial length substantially equaling the diameter of said unthreaded portion, said neck tapering frustoconically from said maximum diameter adjacent said head to a diameter equaling that of said unthreaded portion, said turns having a generally trapezoidal profile in axial section with a leading flank and a trailing flank converging radially outward while including acute angles with an intermediate line perpendicular to said axis, said leading flank terminating short of said intermediate line and adjoining a convex curve which traverses said intermediate line and meets an inwardly sloping back edge extending to said trailing flank.

2. A wood screw as defined in claim 1 wherein said head tapers toward said neck and has an axial length not greater than that of said neck.

3. A wood screw as defined in claim 1 wherein said threaded extremity terminates in a nonthreaded pyramidal tip with at least three converging edges.

4. A wood screw as defined in claim 3 wherein said converging edges converge in a spherically rounded point.

5. A wood screw as defined in claim 3 wherein said turns are spaced apart by a helical groove extending partly into said tip and intersecting at least one of said converging edges to form a notch therein spaced from the point of convergence.

6. A wood screw as defined in claim 1 wherein said back edge is substantially orthogonal to said leading flank and includes an obtuse angle with said trailing edge.

7. A wood screw as defined in claim 6 wherein said leading flank and said back edge merge tangentially into said convex curve.

8. A wood screw as defined in claim 6 wherein said convex curve is a generally quadrantal arc with a center located on said intermediate line.

9. A wood screw as defined in claim 8 wherein said leading flank is an extension of a chord spanning said arc.

10. A wood screw as defined in claim 9 wherein said back edge is an extension of another chord spanning said arc.

11. A wood screw as defined in claim 6 wherein said back edge includes an angle between substantially 10° and 15° with said axis.

12. A wood screw comprising a metallic rod with a head at one end and a threaded extremity remote from said head having helical turns centered on an axis, said extremity terminating in a pointed tip at an end opposite said head, said turns having a generally trapezoidal profile in axial section with a leading flank and a trailing flank converging radially outward while including acute angles with an intermediate line perpendicular to said axis, said leading flank terminating short of said intermediate line and adjoining a convex curve which traverses said intermediate line and meets an inwardly sloping back edge extending to said trailing flank, said leading and trailing flanks being rectilinear in cross section, said back edge being substantially orthogonal to said leading flank and includes an angle between substantially 10° and 15° with said axis.

13. A wood screw as defined in claim 12 wherein said tip is pyramidal with at least three converging edges, said turns being spaced apart by a helical groove extending partly into at least one of said edges to form a notch therein spaced from the point thereof.

* * * * *